United States Patent [19]
Yoshida et al.

[11] Patent Number: 5,265,130
[45] Date of Patent: Nov. 23, 1993

[54] CELL-SIZE INSPECTION DEVICE FOR NUCLEAR FUEL ASSEMBLY

[75] Inventors: Masashi Yoshida; Shuji Yamazaki; Akihiro Kato, all of Ibaraki, Japan

[73] Assignee: Mitsubishi Nuclear Fuel Co., Tokyo, Japan

[21] Appl. No.: 961,662

[22] Filed: Oct. 16, 1992

[30] Foreign Application Priority Data

Oct. 16, 1991 [JP] Japan .................. 3-267947

[51] Int. Cl.⁵ .......................................... G21C 17/00
[52] U.S. Cl. ..................................... 376/245; 376/462
[58] Field of Search ............... 376/261, 340, 277, 245, 376/462

[56] References Cited

U.S. PATENT DOCUMENTS

| | | | |
|---|---|---|---|
| 4,670,211 | 6/1987 | Gaunt et al. | 376/245 |
| 4,772,447 | 9/1988 | Manson et al. | 376/441 |
| 4,777,011 | 10/1988 | Scharpenberg | 376/245 |
| 4,788,026 | 11/1988 | Widener | 376/245 |
| 5,185,124 | 2/1993 | Johansson et al. | 376/439 |

*Primary Examiner*—Donald P. Walsh
*Assistant Examiner*—Frederick H. Voss
*Attorney, Agent, or Firm*—Oblon, Spivak, McClelland, Maier & Neustadt

[57] ABSTRACT

In the nuclear fuel assembly, a plurality of plate-shaped straps are assembled perpendicularly to each other into a grid shape so as to construct a supporting grid providing with a plurality of cells each of which inserts a nuclear fuel rod. A cell-size inspection device which inspects the size of each cell of the supporting grid is constructed by a base, a movable plate, a plurality of pin gauges and a sensor. The supporting grid is mounted on the base, while the movable plate is provided such that it can relatively move with respect to the base in a longitudinal direction of the cells. The pin gauges are provided on the movable plate such that they can freely slide along the longitudinal direction of the cells. When the movable plate is moved toward the supporting grid, each of the pin gauges is to be inserted into each of the cells. The sensor senses whether the pin gauge is relatively moved from the predetermined position of the movable plate. By simply inserting the pin gauge into the cell, it is possible to inspect the cell size with respect to a plenty of cells provided in the supporting grid. Thus, it is possible to inspect all of the cells in an extremely short time, which remarkably reduces the time and cost required for performing the inspection process on the nuclear fuel assembly.

4 Claims, 3 Drawing Sheets

CELL-SIZE INSPECTION DEVICE FOR NUCLEAR FUEL ASSEMBLY

BACKGROUND OF THE INVENTION

1. Field of the Invention

The present invention relates to a cell-size inspection device which is preferable for use in the inspection of the cell size of the supporting grid supporting the nuclear fuel rod provided in the nuclear fuel assembly.

2. Prior Art

In the nuclear fuel assembly, plural plate-shaped straps are assembled perpendicularly to each other into the grid shape, so that the supporting grids each providing plural cells into which nuclear fuel rods are inserted will be formed. When the nuclear fuel rod is inserted into each of the cells of the supporting grid, springs provided in each cell elastically presses the nuclear fuel rod against the walls of the cells, so that the nuclear fuel rods are supported by the supporting grid.

In the above-mentioned assembling method of the nuclear fuel assembly, when inserting the fuel rod into each cell, the springs provided in each cell must come in contact with the fuel rod. This occurs a possibility in that flaws may be formed on the surface of the fuel rod.

In order to cope with such difficulty, the prior-art assembling method is proposed such that prior to the insertion of the fuel rod, a key member is inserted into the supporting grid so as to broaden the springs of each cell.

In the above-mentioned method, in order to ascertain the safe insertion of the fuel rod, prior to the insertion of the fuel rod, a pin gauge having the predetermined size is inserted into each of the cells so as to inspect the inside size of each cell. In this case, by judging the insertion manner of the pin gauge by human eyes, the inspection is performed on the inside size of the cell of which springs are broadened.

However, in the above-mentioned inspection method, a plenty of cells must be inspected one by one by the human. For this reason, when inspecting all of the cells, it takes many working hours and inspectors, which raises a drawback in that the inspection cannot be made efficiently. In addition, since the cell size is inspected visually, there exist differences among individuals, which raises another drawback in that the standardization of the inspection operations among the inspectors must be difficult.

SUMMARY OF THE INVENTION

Accordingly, it is an object of the present invention to provide a cell-size inspection device, for the supporting grid provided in the nuclear fuel assembly, which can inspect a plenty of cells in a short time and with accuracy.

In an aspect of the present invention, there is provided a cell-size inspection device for nuclear fuel assembly which inspects a supporting grid, formed by assembling plural plate-shaped straps perpendicularly to each other into a grid shape, and providing a plurality of cells for inserting nuclear fuel rods. This cell-size inspection device (1) comprises: a base on which the supporting grid is mounted; a movable plate which can be relatively moved with respect to the base along a longitudinal direction of the cells; a plurality of pin gauges which are provided on the movable plate along the longitudinal direction of the cells in a free-sliding manner, wherein each of the pin gauges is inserted into each of the cells when the movable plate is moved toward the supporting grid; and a sensor for sensing whether each of the pin gauges is relatively moved from the predetermined position of the movable plate.

According to the above-mentioned cell-size inspection device, by moving the movable plate toward the supporting grid in the longitudinal direction of the cells, a plurality of pin gauges provided on the movable plate are respectively inserted into the cells of the supporting grid. Herein, if the contacting pressure of the springs provided in each cell is within the predetermined range of pressure, the pin gauge is smoothly inserted into the cell. However, if the contacting pressure is larger than the predetermined range of pressure, the pin gauge is failed to be inserted into the cell, so that it may be partially projected onto the outside of the movable plate. This projection of the pin gauge is sensed by the sensor, so as to judge whether or not the cell has a desirable and sufficient size.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

[A] Construction of Embodiment

Now, description will be given with respect to the cell-size inspection device according to an embodiment of the present invention by referring to FIGS. 1 to 3, wherein parts identical to those shown in the other drawings will be designated by the same numerals.

Figure 1:
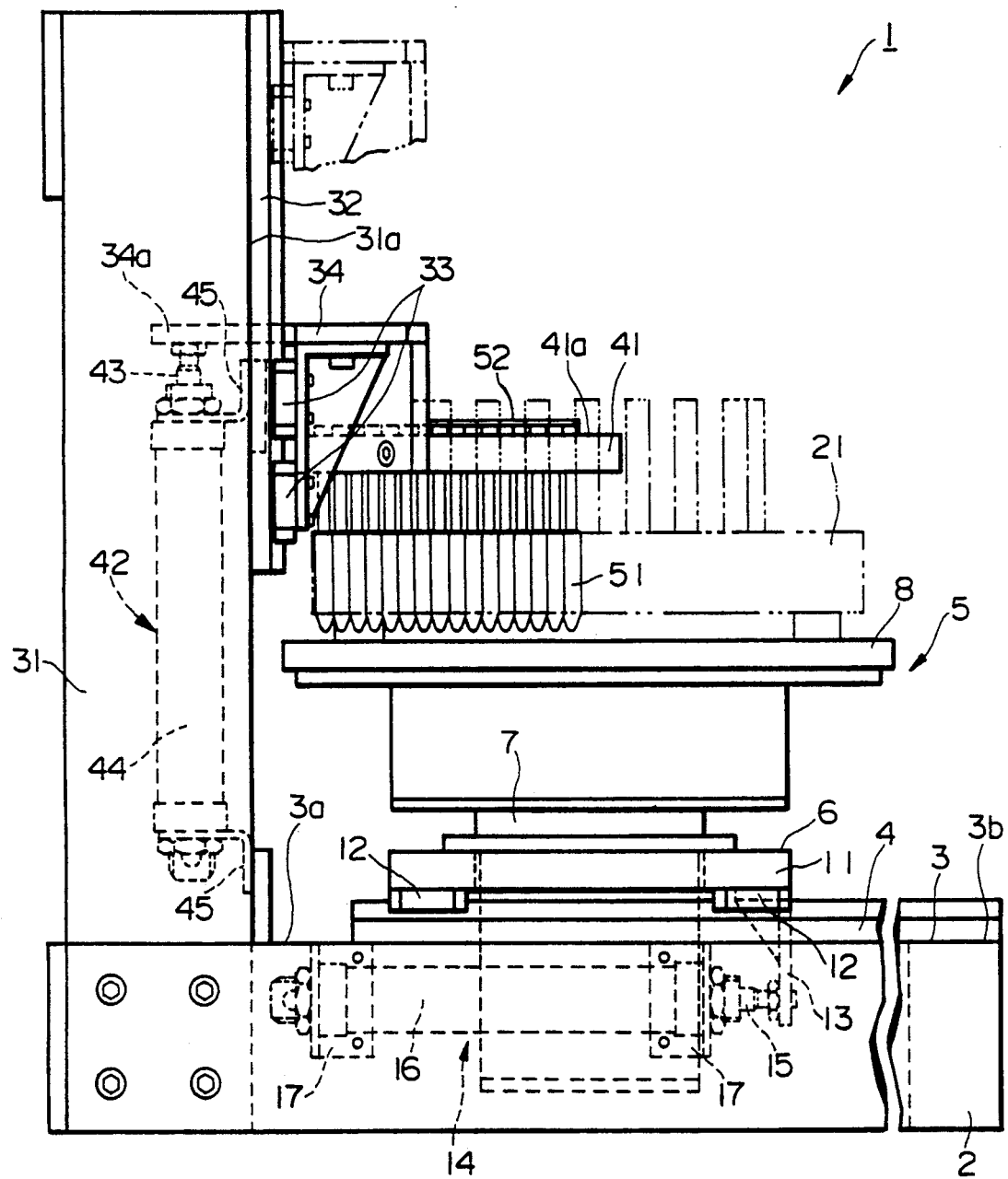
FIG. 1 is a front view illustrating a cell-size inspection device according to an embodiment of the present invention.
Figure 2:
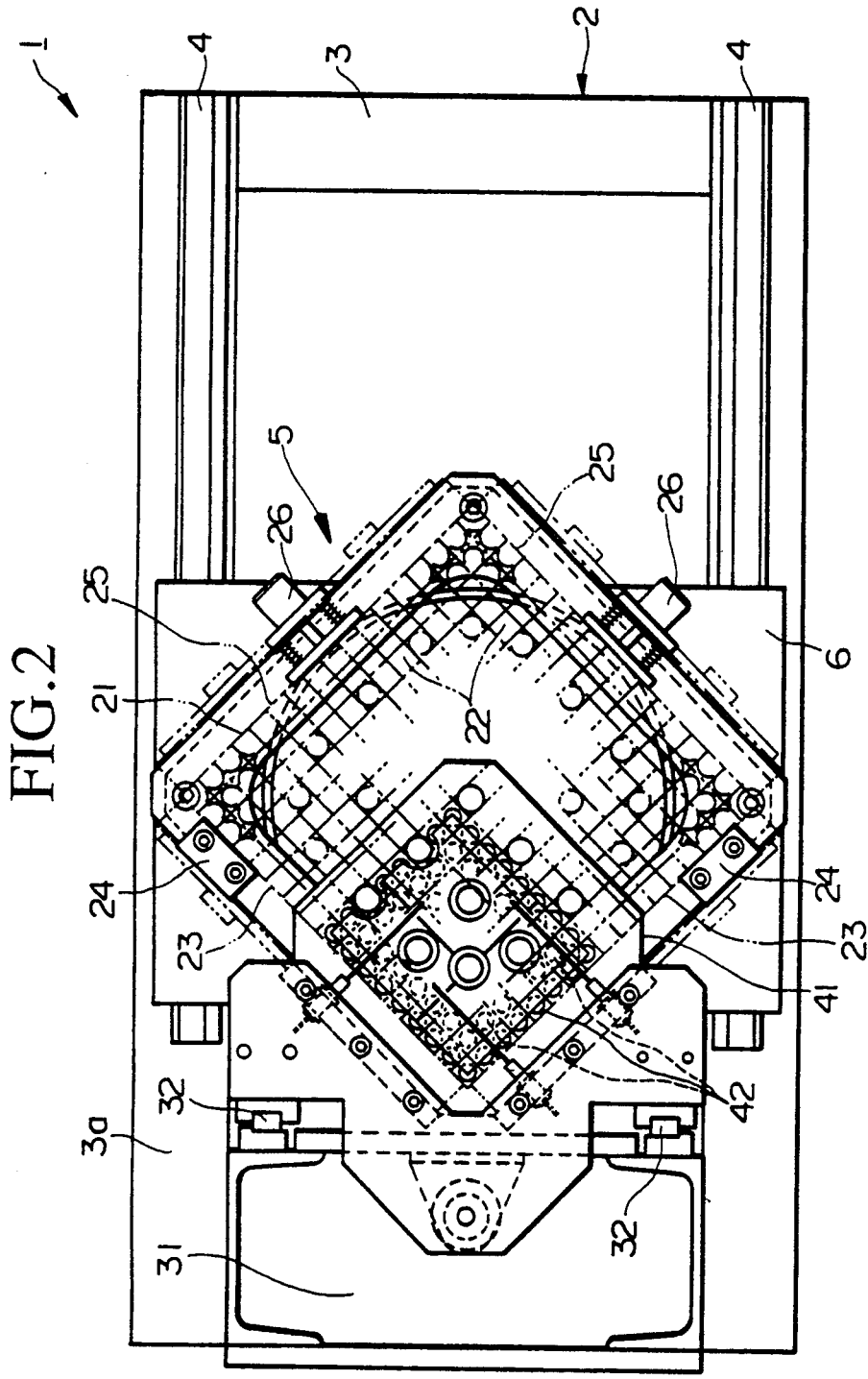
FIG. 2 is a plan view illustrating the cell-size inspection device.
Figure 3:
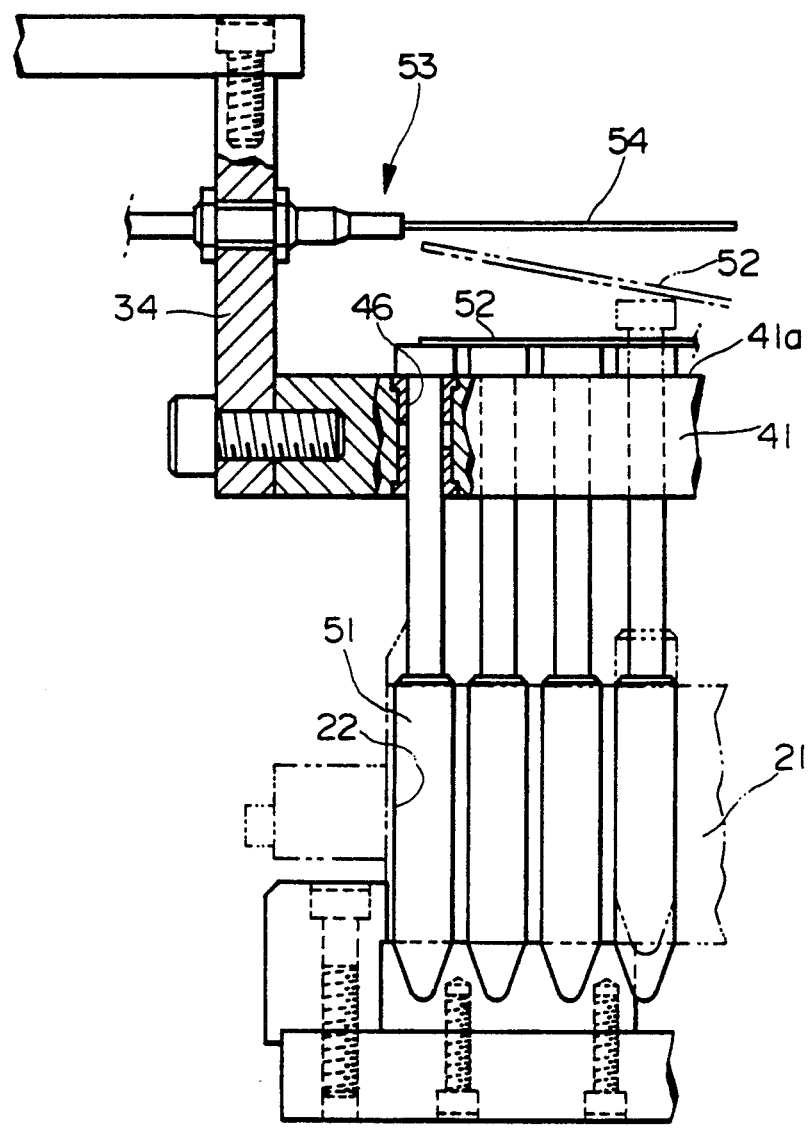
FIG. 3 is a front view illustrating an enlarged part, including the movable plate portion, of the cell-size inspection device.

FIGS. 1 and 2 show a cell-size inspection device 1, in which a pair of rails 4 are laid in parallel in a longitudinal direction on an upper surface 3 of a frame 2. More specifically, the rails 4 are laid on a part of the upper surface 3 which excludes an edge portion 3a from the whole surface of the frame 2. On these rails 4, a base 5 is mounted.

The base 5 is roughly constructed by a base plate 6, a rotation shaft 7 and a table 8.

In the base plate 6, at corner portions of an lower surface of a rectangular-shaped plate portion 11, there are provided guides 12 by which the base plate 6 can be freely slid on the rails 4 and also fixed at an arbitrary position on the rails 4.

The rotation shaft 7 stands vertically on the center portion of the base plate 6, so that it can rotate about its vertical axis by every predetermined angle, e.g., 90 degrees.

The table 8 is a square-shaped plate which is fixed on the rotation shaft 8. In accordance with the step-rotation of the rotation shaft 7 which is rotated by every predetermined angle (e.g., 90 degrees), the table 8 is rotated by the predetermined angle within a horizontal plane.

In addition, a bracket 13 is fixed at a lower-edge portion of the base plate 6, while this bracket 13 is interconnected with a rod 15 of an actuator 14. At one side portion of the frame 2 along its longitudinal direction, a cylinder 16 of the foregoing actuator 14 is fixed horizontally by a pair of brackets 17. According to the above-mentioned mechanism, while the rod 15 is moved within the cylinder 16, the base plate 6 is slid on the rails 4. Further, there is provided a supporting grid 21 which is mounted on the table 8.

The supporting grid 21 is formed by assembling the plate-shaped straps perpendicularly to each other into the grid shape. Among these grids, there is formed a space (which is called a cell 22) in which the nuclear fuel rod is inserted.

Two, adjacent side surfaces 23 of the supporting grid 21 are respectively in contact with two contacting members 24 which are located at adjacent two sides of the table 8. In addition, the other side surfaces 25 respectively adjoining the above-mentioned side surfaces 23 of the supporting grid 21 are pressed by two pressing members 26 which are respectively located at the other two sides of the table 8.

Meanwhile, a supporting post 31, which is vertically extending, stands on the edge portion 3a which partially occupies the upper surface 3 of the frame 2. In addition, a pair of rails 32 are vertically laid in parallel at a side surface 31a of the supporting post 31 in its longitudinal direction. Further, a pair of guides 33 are respectively engaged with these rails 32 in a free-sliding manner. Furthermore, a bracket 34 is fixed to these guides 33, and a movable plate 41 is held in a horizontal manner by this bracket 34.

In addition, an upper-edge portion 34a of the bracket 34 is projecting into the inside of the supporting post 31, and this upper-edge portion 34a is interconnected with a rod 43 of an actuator 42. At a side surface 31a of the supporting post 31, a cylinder 44 of the actuator 42 is fixed vertically by a pair of brackets 45. While the rod 43 is moving within the inside of the cylinder 44, the guides 33 engaged with the rails 32 are slid on the rails 32. Accompanied with the movement of these guides 33, the movable plate 41 is moved up or down.

An upper surface 41a of the movable plate 41 has a square shape and an area of which size is identical to a quarter of the surface of the supporting grid 21. As shown in FIG. 3, a through hole 46 is formed vertically through the movable plate 41 at a position corresponding to the position of each cell 22 of the supporting grid 21. Further, a pin gauge 51 is inserted into each of the through holes 46 so that it is hung by the movable plate 41. On each of the pin gauges 51, a plate 52 having a thin thickness is mounted.

Meanwhile, a sensor 53 is located at a position which is placed above the fixing position between the bracket 34 and movable plate 41 by the predetermined distance.

This sensor 53 provides a touch needle 54. Thus, when the plate 52 or pin gauge 51 touches and presses this touch needle 54, the sensor 53 senses the pressure.

[B] Inspection Method

Next, description will be given with respect to the inspection method by which the size of the cell 22 of the cupporting grid 21 is inspected by use of the cell-size inspection device 1 according to the present embodiment.

First, the actuator 14 is operated to move the base 5 toward the other-edge portion 3b which partially occupies the upper surface 3 of the frame 2. At the same time, the actuator 42 is operated to move the movable plate 41 up to the higher position of the supporting post 31.

Next, the pressing members 26 are moved horizontally toward the outside of the table 8; the supporting grid 21 is mounted on the table 8; and then, the adjacent side surfaces 23 of the supporting grid 21 are respectively brought in contact with the contacting members 24 provided on the table 8, while the other side surfaces 25 are respectively pressed by the pressing members 26, so that the supporting grid 21 is fixed on the table 8.

Then, the actuator 14 is operated to move the base 5 toward the one-edge portion 3a which partially occupies the upper surface 3 of the frame 2, so that the base 5 is located at the predetermined position on the one-edge portion 3a.

Next, the actuator 42 is operated to move down the movable plate 41, so that the pin gauge 51 is inserted into each of the cells, of which number is roughly a quarter of the whole number of the cells provided in the supporting grid, in the vicinity of the supporting post 31.

In this case, if the contacting pressure of the springs of each cell 22 is within the predetermined range of the pressure, the pin gauge 51 is rapidly inserting into the cell 22. On the other hand, if the contacting pressure is larger than the predetermined range of the pressure, the pin gauge 51 is not inserted into the cell 22, so that the pin gauge 51 is vertically projected up from the upper surface 41a of the movable plate 41. Therefore, if one or more pin gauges 51 are vertically projected up, the plates 52 mounted on these pin gauges 51 must be raised up to depress the touch needle 54 of the sensor 53. Thus, it is possible to find out the defective cell 22.

Thereafter, the actuator 42 is operated to move up the movable plate 41, and then, the rotation shaft 7 is rotated by 90 degrees in a clockwise direction which is observed from the above. Next, the actuator 42 is operated again to move down the movable plate 41, and then, the inspection is performed on the cells 22, of which number is roughly a quarter of the whole number of the cells provided in the supporting grid 21, in the vicinity of the supporting post 31.

By repeating the above-mentioned operation, it is possible to inspect all of the cells 22 provided in the supporting grid 21.

After completing the inspection for all of the cells 22 provided in the supporting grid 21, the actuator 42 is operated to move up the movable plate 41 and locate it at the higher position of the supporting post 31. Next, the actuator 14 is operated to move the base 5 toward the other-edge portion 3b of the upper surface 3 of the frame 2 and locate it at the predetermined position on the other-edge portion 3b. Thereafter, the supporting grid 21 is removed from the table so as to complete a series of inspection operations.

As described heretofore, according to the cell-size inspection device 1 which is designed on the basis of the present invention, it is possible to rapidly and smoothly perform the inspection on all of many cells 22 by merely performing maximum four operations. Therefore, it is possible to inspect all of the cells in an extremely short time. In other words, it is possible to remarkably reduce the working hours required for performing the inspection process, by which the cost required for this inspection process can be remarkably reduced as well. Meanwhile, the inspection can be performed objectively, there is no chance to occur any difference among the individuals, so that the standardization of the inspection operation can be achieved.

Incidentally, the present invention is not limited to the use of the foregoing tough-needle-type sensor 53, therefore, it is possible to employ several kinds of sensors. For example, it is possible to employ a sensor consisting of the light emitting diode (or light emitting element) and light receiving diode (or light receiving element). In this case, the horizontal plane positioned above the movable plate 41 is scanned by this sensor, thus, it is possible to specify the position of the pin gauge 51 corresponding to the defective cell.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. In a cell-size inspection device for nuclear fuel assembly which inspects a supporting grid, formed by assembling plural plate-shaped straps perpendicularly to each other into a grid shape, and providing a plurality of cells for inserting nuclear fuel rods, said cell-size inspection device comprising:

a base on which said supporting grid is mounted;

a movable plate which can be relatively moved with respect to said base along a longitudinal direction of said cells;

a plurality of pin gauges which are provided on said movable plate along the longitudinal direction of said cells in a free-sliding manner, each of said pin gauges being inserted into each of said cells when said movable plate is moved toward said supporting grid; and a sensor for sensing whether each of said pin gauges is relatively moved from a predetermined position of said movable plate.

2. In a cell-size inspection device for nuclear fuel assembly constructed by a supporting grid in which cells are formed such that fuel rods can be inserted into these cells, said cell-size inspection device comprising:

a frame having a horizontally extending shape;

a base which is located on said frame in a free-sliding manner, and on which said supporting grid is mounted such that openings of said cells are vertically directing upward;

a first actuator for sliding said base on said frame so as to locate it at a desirable horizontal position;

a supporting post of which one edge portion is fixed to said frame, while the other portion is extending vertically;

a movable plate of which one edge portion is engaged with said supporting post, so that said movable plate is vertically moved up or down;

a second actuator for vertically moving said movable plate up or down along a vertical direction of said supporting post so as to locate it at a desirable vertical position;

a plurality of pin gauges which are arranged at predetermined positions of said movable plate so that they are respectively inserted into said cells of said supporting grid when said movable plate is moved down by said second actuator; and a sensor for sensing a defective event in which said pin gauge is failed to be inserted into said cell, whereby a cell size is inspected by judging whether or not each of said pin gauges is inserted into each of said cells of said supporting grid.

3. A cell-size inspection device as defined in claim 1 or 2 wherein said sensor provides a touch needle which when being touched with said pin gauge failed to be inserted into the cell, senses touching pressure so as to judge whether a defective cell having an undesirable cell size is existed in said cells of said supporting grid.

4. A cell-size inspection device as defined in claim 1 or 2 wherein said sensor is constructed as a photo-type sensor including a light emitting element and a light receiving element.

* * * * *